United States Patent [19]

Audeh et al.

[11] Patent Number: 4,938,935

[45] Date of Patent: Jul. 3, 1990

[54] ALTERATION OF THE CHARACTER OF HYDROGEN FLUORIDE DROPLETS RENDERING THEM MORE SUSCEPTIBLE TO A WATER DRENCH

[75] Inventors: Costandi A. Audeh, Princeton; Saverio G. Greco, Princeton Junction, both of N.J.

[73] Assignee: Mobil Oil Corporation, New York, N.Y.

[21] Appl. No.: 229,669

[22] Filed: Aug. 8, 1988

[51] Int. Cl.$^5$ ................................................ C01B 7/19
[52] U.S. Cl. ................................... 423/240; 423/483; 585/725; 585/853; 585/854
[58] Field of Search ................ 423/240, 483; 585/723, 585/724, 725, 853, 854

[56] References Cited

U.S. PATENT DOCUMENTS

| | | | |
|---|---|---|---|
| 2,379,041 | 6/1945 | Schulze et al. | 423/240 R |
| 2,537,076 | 1/1951 | McCaulay et al. | 423/240 |
| 3,016,285 | 1/1962 | Clifford | 423/240 |
| 3,709,978 | 1/1973 | Predikant | 423/240 |
| 3,865,896 | 2/1975 | McCoy et al. | 585/725 |
| 4,210,460 | 7/1980 | Seidenberger | 134/7 |
| 4,552,624 | 11/1985 | Clarkson | 204/1 T |
| 4,629,610 | 12/1986 | Friese et al. | 423/240 |

OTHER PUBLICATIONS

Matheson Gas Data Book, 5th Ed., pp. 305–309.
1982 Hazardous Material Spills Conference Proceedings, 1982, pp. 363–365.
Kirk–Othmer Encyclopedia of Chemical Technology, 3rd Ed. vol. 1, pp. 624, 654–655.
Gordon K. Braley, Several Remedies for the Treatment of Spillages of Liquid Hazardous Chemicals, pp. 103–108.

*Primary Examiner*—Asok Pal
*Attorney, Agent, or Firm*—Alexander J. McKillop; Charles J. Speciale; Malcolm D. Keen

[57] ABSTRACT

The incorporation of a proton acceptor to an HF alkylation composition. The addition alters the character of HF droplets in an HF cloud rendering a forming HF cloud more easily treated by a simple water drench.

14 Claims, 1 Drawing Sheet

ALTERATION OF THE CHARACTER OF HYDROGEN FLUORIDE DROPLETS RENDERING THEM MORE SUSCEPTIBLE TO A WATER DRENCH

FIELD OF THE INVENTION

This invention relates to methods for controlling and neutralizing a hydrogen fluoride vapor cloud by altering the nature of the hydrogen fluoride droplets contained therein.

BACKGROUND OF THE INVENTION

Hydrogen fluoride, or hydrofluoric acid (HF) is highly toxic and corrosive. However, it is used as a catalyst in isomerization, condensation, polymerization and hydrolysis reactions.

The petroleum industry uses anhydrous hydrogen fluoride primarily as a liquid catalyst for alkylation of olefinic hydrocarbons to produce alkylate for increasing the octane number of gasoline. It is estimated that the U.S. petroleum alkylation industry uses 5% of the HF produced in the U.S. Its importance and acceptance is evidenced by the fact that in 1978 U.S. refiners scheduled eight new HF alkylation plants with a total capacity of 7,950 m$^3$ (50,000 barrels) of alkylate per day. The total U.S. HF alkylation capacity in 1984 was 69,160 m$^3$ (435,000 barrels) per day, and 0.43 to 1.0 kg of HF were used per cubic meter of alkylate.

Years of experience in its manufacture and use have shown that HF can be handled safely, provided the hazards are recognized and precautions taken. Though many safety precautions are taken to prevent leaks, massive or catastrophic leaks are feared primarily because the anhydrous acid will fume on escape creating a vapor cloud that can be spread for some distance.

A number of qualitative methods have been proposed for treating HF spills. The most common method is the use of a simple water drench system. Kirk-Othmer: Encyclopedia of Chemical Technology 3rd Edition, Volume 1, page 655 reports that "water, the most common liquid absorption is used for removing acidic gases ... especially if the last contact is with water of alkaline pH". However, because of the aerosol nature of a HF cloud, the water drench generally cannot remove all the HF present in an HF cloud.

U.S. Pat. No. 4,210,460 relates to treating an HF liquid spill by applying to the spill a quantity of an aqueous solution of calcium acetate equal to at least seven times the estimated volume of the spill, and thereafter treating the spill with powdered magnesium oxide and a pH indicator such as bromothymol blue. After the mixture reaches a persistent blue color, indicating a safe state, the spill is cleaned up mechanically.

At the 1982 Hazardous Material Spills Conference, Edward C. Norman of National Foam System Inc. reported the application of CHF-784 foam (a proprietary composition) to the contents of a damaged tank emitting an HF cloud after treatment with limestone. An immediate reduction in fume evolution was apparent after the foam application.

Gordon K. Braley, at the proceedings of the 1980 National Conference on Control of Hazardous Material Spills, in Louisville, Ky. on May 15, 1980 reported the treatment of relatively small amounts of controlled liquid spills of anhydrous hydrogen fluoride with high molecular weight polymers including polyacrylamide, polymethyl methacrylate, and polyvinyl alcohol. These materials applied in the form of a bead polymer formed a "skin" over the spill preventing fuming of the liquid. Polyacrylamide was deemed the most effective skin-forming agent.

Of the art cited above, only Edward C. Norman discusses an alleged successful treatment of a cloud containing HF. However, the composition used to treat such a cloud is not disclosed to the public.

The present invention was devised to provide an effective method and apparatus for containing an HF cloud.

SUMMARY OF THE INVENTION

The instant invention relates to the incorporation of a chemical additive, i.e., a proton acceptor to an HF-alkylation acid composition. The proton acceptor alters the charge on HF droplets and the surface tension of HF droplets, making them more easily treated by a simple water drench. More clearly stated, the invention relates to changing the characteristic of the HF droplets during an HF-alkylation acid spill, so that the nature and/or size of the HF droplets are changed to make them more vulnerable to a water drench.

DETAILED DESCRIPTION OF THE INVENTION

Figure 1:
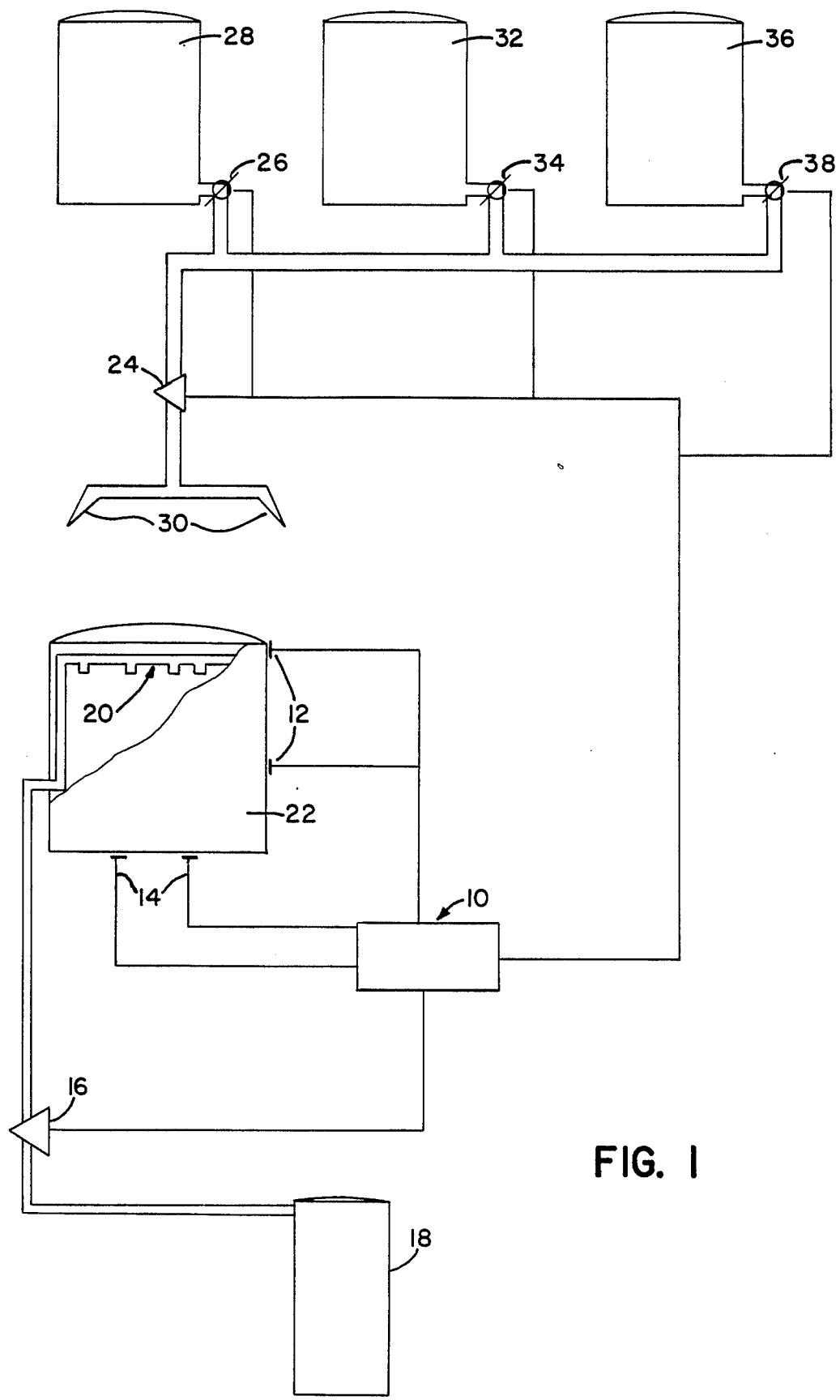
FIG. 1 is a schematic drawing of an apparatus used to practice the present invention.

An HF-alkylation acid composition is composed of about 88% HF, 6.5% acid soluble oils, 4% $C_3/C_4$ alkylate and 1.5% water. Generally, an alkylating plant is able to cope with minor spills of HF-alkylation acid caused by corroded flanges, valves, etc. However, in the event of a massive leak or spill of HF-alkylation acid, from an alkylating unit, an aerosol cloud will form instantaneously. It is estimated that the cloud will be made up of 70 to 88% of HF aerosol droplets having a size in the range of 0.5 to 5.0$\mu$ these liquid droplets have a surface tension of 8.62 dynes/cm at 18.2° C. These droplets are very small compared to the droplets of water in a normal water drench and therefore a simple water drench is not generally capable of removing the entire HF spill. As stated above, water sprays are not completely effective in knocking down an HF cloud because the water droplets, being much bigger than the droplets of HF aerosol vapor, cannot blanket the cloud containing the HF vapor.

Variables that control the size of droplets in a cloud include the charge on the particles, the surface tension of the liquid from which the particles are made and the influence of various solutes present in the HF-alkylation acid mixture. Thus, the alkylation acid on escape will develop a cloud characteristic of its composition, the charge of the HF droplets and the surface tension of the droplets at the time of the leak.

The invention is employed in a system which relies on the detection of a massive HF leak, i.e., a leak which can escape as a toxic cloud beyond the confines of the alkylation unit as compared to a small leak, which quickly dissipates on release to the atmosphere. To ensure early detection of a massive leak, HF detectors should be placed about the top periphery of the storage tank or tower containing HF-alkylation acid and about a mid-portion of such a storage facility. The detectors should also be located at weld seams, pipe connections and other conduits used for transporting HF-alkylation acid to the alkylating reactor, where a leak might occur.

The primary HF detectors detect the presence of HF in amounts of at least 20 parts per million which is an amount designated by the National Institute of Occupational Safety and Health as an amount which is an "immediate danger to life and health" if one is exposed to such a concentration for 30 minutes. As little as 50 parts per million is deemed a lethal dose.

Primary HF detectors such as the devices disclosed and claimed in U.S. Pat. No. 4,552,624, herein incorporated by reference, may be used in the method of the invention. However, the invention is not limited to the use of this specific detector.

Although primary HF detectors can monitor an initial HF leak and transmit such information to a computer which then activates the drenching steps of the invention described below, additional electro-mechanical devices as secondary detectors are used in combination with the HF detectors to determine and verify that a massive leak, or a leak which can spread a cloud of toxic gas beyond the confines of the alkylating unit, has taken place.

For instance, the temperature of the walls of an HF containment vessel or alkylating unit, and the pressure within the tank and feed lines are constantly monitored. As shown in FIG. 1, a computer 10 oversees the collection of the data registered by the devices, including the primary HF detectors 12, and the secondary temperature or pressure detectors 14. When the collected data indicates a massive leak, such as by a large pressure change and a temperature change, which are associated with such a leak, the computer 10 activates the steps of the invention.

In a first embodiment of the invention, on the detection of a massive HF leak, the addition of a proton acceptor, i.e., a material which functions as a base, in the Bronsted-Lowry concept of acid/bases, is added to the alkylation acid. The acid/base reaction between HF and the proton acceptor (PA) is shown in equation I below:

$$2HF + PA \rightleftharpoons PAH^+ + [HF_2]^- \qquad I$$

For example, if the proton acceptor is acetic acid, i.e., a weak acid compared to the strong acid HF, the resultant composition will include ions of protonated acetic acid and hydrofluoride ions as shown in equation II below:

$$CH_3COOH + 2HF \rightleftharpoons [CH_3COOH_2]^+ + [HF_2]^- \qquad II$$

More particularly, as shown schematically in FIG. 1, once a leak is detected and reported to computer 10, by detectors 12 and 14, pump 16 is activated causing injection of the proton acceptor, stored in tank 18, into the structure 20 where the HF leak is occurring. As seen, the injection mechanism 20 is positioned inside the top of the HF storage structure 22. The proton acceptor will receive a proton from HF as shown in equation I or II above, thus changing the characteristics of HF droplets rendering the droplets more susceptible to a water drench.

In a second embodiment of the invention, a proton acceptor is added to the HF-alkylation acid as part of the circulating acid charged to an alkylating unit. In this manner, the proton acceptor is a permanent component of the HF-alkylation acid catalyst, and HF escaping or accidentally released into the atmosphere is immediately rendered susceptible to a water drench eliminating the need to provide additional injection means for injecting a proton acceptor into the escaping HF.

Examples of proton acceptors which are useful in either embodiment of the invention are compounds which have a structure chemically stable to HF and behave like bases in the strong acid environment of HF. A particularly effective compound is:

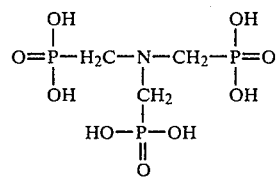

In this compound, the OH groups act as proton acceptors and the nitrogen is quarternized. The use of such a compound as above will create a positively charged entity, and $[HF_2]^-$ as the negatively charged counter ion. Other compounds capable of multiple protonation include 1-hydroxyethyldene-1,-1-diphosphonic acid, ethylenediaminetetramethylphosphonic acid, diethylenetriaminepentamethylphosphonic acid as well as acids without phosphorus such as polyacrylic acid, polymaleic acid and ethylenediaminetetraacetic acid. Such compounds are not soluble in the hydrocarbon phase but are soluble in acid. Most of these compounds are sold as water solutions containing 50% or more of the desired acid and may be used as is. The proton acceptors being injected into, or circulated with HF-alkylation acid, are used in concentrations in the range of 0.01–30% and preferably in the range of 0.15–10%.

By rendering HF more susceptible to a water drench from the very beginning stages of an HF massive leak, HF forming clouds can be treated with a water drench, which is activated by the computer upon detecting an HF leak. Using a simple water drench eliminates the need to use chemicals which are more costly than water. The method of the invention also makes it much easier to clean up an HF spill after an accident.

The invention can also be practiced in combination with other methods for removing HF. As shown schematically in FIG. 1, a particularly effective method relates to a tripartite drench system which includes a first step water drench. For instance, after the HF cloud has been modified with a proton acceptor, the computer activates pump 24, and opens valve 26. Water from an on-site storage tank 28, or other supply is pumped at about 8,000 gals/min to spray nozzles 30 located above and surrounding the alkylation acid structure 22. This first water drench could conceivably contain the entire forming HF cloud. However, in the event of a massive leak, i.e., a leak capable of forming a toxic cloud which cannot be contained within the confines of the alkylation unit, a water drench may not absorb all of the HF. Therefore, even after the first initial detection of the presence of HF the primary HF detectors will continually monitor for the presence of HF. The data will be constantly compiled by computer 10 which will continue the water drench for a short period until the computer determines that the continued water application alone is ineffective in removing HF. The water drench is then shut down or used in combination with a second drench.

In order to contain a greater portion of the cloud an aqueous drench containing an alkaline earth chloride is released concurrently with, or after the initial water drench. Suitable aqueous solutions include solutions which contain at least one compound of the formula of $CaCl_2$, and $CaBr_2$. Preferred aqueous solutions contain $CaCl_2$.

Calcium chloride or calcium bromide will react with HF to form water-insoluble $CaF_2$ salts which are harmless. Hydrochloric acid is also produced in the reaction between $CaCl_2$ and HF, and the HCl can be neutralized by application of lime after containment of the HF cloud. The aqueous calcium chloride or bromide solutions contain between about 0.1 to 30 parts of the halogen compound per 100 parts of water, preferably 5 to 10 parts of the halogen compound per 100 parts of water. This second drench is delivered to the area of the leak, under control of computer 10 from a second on-site storage tank 32 by pump 24 at a rate of about 8,000 gal/min after the computer opens valve 34. If large quantities of HF are still detected by the computer as it monitors the HF detectors, a third drench is activated by the computer. This drench can be used alone or in combination with the first two drenches.

The third aqueous drench is composed of (i) at least one surfactant capable of generating a foam, (ii) a foam stabilizer and (iii) a phase transfer agent.

Surfactants capable of generating a foam include anoionic surfactants, cationic surfactants and non-ionic surfactants. A non-limiting compilation of specific surfactants capable of generating a foam are disclosed in Kirk-Othmer: Encyclopedia of Chemical Technology, 3rd Edition, Volume 22, pages 332-386 which is herein incorporated by reference.

The second component of the third drench is chosen for its ability to sustain the foam. A suitable, non-limiting, foam-sustaining component is a trialkylamine-N-oxide of the formula:

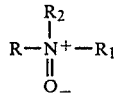

wherein R and $R_1$ and $R_2$ are the same or different and represent linear or branched $C_1$-$C_{18}$ alkyl groups. The trialkylamine-N-oxide can be used in concentrations of between 0.01-50% and preferably between 0.05-15%.

The phase transfer agent of the third drench is a material which has the ability to traverse the boundaries of the hydrocarbon-aqueous interface and withdraw trapped acid, transferring it to the foam, allowing for containment of the remaining HF. Suitable phase transfer agents include 'onium salts, such as ammonium, phosphonium and arsonium species, and the polyethers, including polyethylene glycols, including derivatives thereof such as crowns, cryptates etc.

A non-limiting list of possible phase transfer agents include such 'onium salts as benzyltriethylammonium chloride, benzyltrimethylammonium chloride, benzyltrimethylammonium hydroxide, benzyltrimethylammonium methoxide, benzyltriphenylphosphonium chloride, didodecyldimethylammonium chloride, hexadecylbenzyldimethylammonium chloride, hexadecyldimethylethylammonium bromide, 1-hexadecylpyridinium bromide, hexadecyltributylphosphonium bromide, octadecylbenzyldimethylammonium chloride, tetramethylammonium chloride. A second non-limiting list of possible phase transfer agents include crown ethers such as Benzo-15-Crown-5 ($C_{14}H_{20}O_5$), 18-Crown-5 (1,4,7,10,13-16 hexaoxacyclooctadecane), Dibenzo-18-Crown-8 ($C_{20}H_{24}O_6$), Dicyclcohexano-18-Crown-6 ($C_{20}H_{38}O_6$), cryptates, such as 1,10-Diaza-18-Crown-6 ($C_{12}H_{28}N_2O_4$), 4,7,13,16,21 Pentaoxa-1,10-diazabicyclo [8.8.8.] tricosane ($C_{15}H_{32}N_2O_5$).

The third drench serves a plurality of purposes. The foam will suppress the HF cloud; the foam, through its phase transfer component, will transfer the HF trapped within the hydrocarbon component of the alkylation acid to the aqueous phase and; thirdly, the foam stabilizer of the drench helps neutralize remaining HF. The foam will also absorb toxic vapors.

The third drench is pumped by pump 24 from storage tank 36, located within the vicinity of the alkylation unit, after the computer opens valve 38, to the HF leak at a rate of about 8,000 gals/min.

Once the HF cloud has been contained, i.e., knocked to the ground, the HCl is neutralized with lime and the solid $CaF_2$ formed is removed by mechanical means.

The order of the drenches is released in the most economical sequence possible, i.e., first the water drench is released, then the alkaline earth chloride drench and then the application of the foam drench. However, the drenching steps of the invention can also be practiced by concurrently delivering all three drenches through separate pipelines to a spill at individual rates of about 8,000 gal/min, or at combined rates of about 8,000 gal/min.

In another embodiment, tank 32 contains a concentrated solution of $CaCl_2$, for instance the concentration may be a 50% concentrated solution of $CaCl_2$, and tank 36 contains a concentrated composition (e.g., 50%) composed of at least one surfactant capable of generating a foam, a foam stabilizer and a phase transfer agent.

Separate vacuum or aspirating pipes (not shown) are connected to tanks 32 and 36 and to a water supply line which is connected at one end to a water supply and at a second end to nozzles 30. The flow rate of the water passing through the supply line is regulated and the concentrated solutions are sucked into the supply line and diluted to desired concentration before passing from the water supply line to nozzles 30. Using a concentrated solution, of course, allows for greater drench storage capacity.

Although the invention has been described above with reference to specific embodiments, it should be apparent that changes and modifications may be made without departing from the spirit and scope of the invention. Accordingly, the invention is not limited by the foregoing description, but is only limited by the scope of the amended claims.

What is claimed is:

1. A method for rendering a liquid hydrofluoric acid composition more susceptible, upon vaporization, to a water drench, which comprises adding a proton acceptor which is capable of multiple protonation to said hydrofluoric acid composition, which thus changes the character of hydrofluoric acid droplets present in said vaporous state and renders the hydrofluoric acid droplets more susceptible to a water drench.

2. A method for rendering hydrofluoric acid present in a vapor cloud, formed from the escape of hydrofluoric-alkylation acid from its containment facility, more susceptible to a water drench, which comprises contacting the hydrofluoric-alkylation acid with a proton acceptor which is capable of multiple protonation, thus changing the characteristics of the hydrofluoric acid droplets in the vapor could and rendering the hydrofluoric acid droplets more susceptible to the water drench.

3. The method of claim 2 which comprises adding the proton acceptor to the hydrofluoric-alkylation acid prior to escape, so that on escape of the hydrofluoric-alkylation acid, the acid is immediately rendered susceptible to a water drench.

4. The method of claim 3 which comprises injecting the proton acceptor into a hydrofluoric-alkylation acid catalyst composition contained in a hydrofluoric-alkylation acid catalyst storage facility.

5. The method of claim 4 wherein said proton acceptor is selected from the group consisting of 1-hydroxyethyldene-1,1-diphosphonic acid, ethylenediaminetetramethylphosphonic acid, diethylenetriaminepentamethylphosphonic acid polyacrylic acid, polymaleic acid and ethylenediaminetetraacetic acid.

6. The method of claim 4 wherein the proton acceptor has the structure of the formula

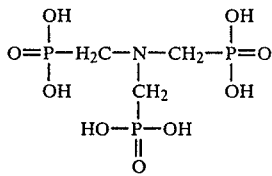

7. A method for the containment of a vaporous cloud containing hydrofluoric acid which comprises:
 (a) contacting a hydrofluoric acid-containing vaporous cloud with a proton acceptor capable of multiple protonation to render droplets of the hydrofluoric acid more susceptible to a water drench; and
 (b) drenching the cloud with water.

8. A method for the containment of a vaporous cloud containing hydrofluoric acid and a proton acceptor which comprises the steps of:
 (a) contacting a hydrofluoric acid-containing composition with a proton acceptor, prior to the formation of said vaporous cloud, and during the formation of said hydrofluoric acid containing vapor cloud;
 (b) drenching the cloud with water;
 (c) drenching the cloud with an aqueous solution containing at least one compound of the formula of $CaCl_2$ and $CaBr_2$; and
 (d) drenching the cloud with a solution composed of water, at least one surfactant, a foam stabilizer and a phase transfer agent.

9. The method of claim 8 wherein said aqueous solution of step C contains $CaCl_2$.

10. The method of claim 8 which further comprises detecting the escape of hydrofluoric acid, and performing steps (a), (b), (c) and (d) upon such detection.

11. The method of claim 8 wherein said foam stabilizing agent is a trialkylamine-N-oxide.

12. The method of claim 8 wherein said method includes the detection of a massive hydrofluoric acid leak.

13. The method of claim 8 wherein said aqueous solution of at least one $CaCl_2$ and $CaBr_2$ is prepared by diluting a concentrated solution of the same with water, and wherein said composition comprising at least one surfactant capable of generating a foam, a foam stabilizer, and a phase transfer agent is prepared by diluting a concentrated solution of the same with water.

14. A method for the containment of a vaporous cloud containing hydrofluoric-alkylation acid and a proton acceptor which comprises the steps of:
 (a) contacting a hydrofluoric-alkylation acid-containing composition with a proton acceptor, prior to the formation of said vaporous cloud, and during the formation of said hydrofluoric-alkylation acid containing vapor cloud;
 (b) drenching the cloud with water;
 (c) drenching the cloud with an aqueous solution containing at least one compound of the formula of $CaCl_2$ and $CaBr_2$; and
 (d) drenching the cloud with a solution composed of water, at least one surfactant, a foam stabilizer and a phase transfer agent.

* * * * *